US008990957B2

(12) United States Patent
Aggarwal et al.

(10) Patent No.: US 8,990,957 B2
(45) Date of Patent: *Mar. 24, 2015

(54) TAKING CONFIGURATION MANAGEMENT DATA AND CHANGE BUSINESS PROCESS DATA INTO ACCOUNT WITH REGARD TO AUTHORIZATION AND AUTHENTICATION RULES

(71) Applicant: International Business Machines Corporation, Armonk, NY (US)

(72) Inventors: Vijay Kumar Aggarwal, Austin, TX (US); Scott Stephen Dickerson, Austin, TX (US); Adam Reudeau Holley, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 88 days.

This patent is subject to a terminal disclaimer.

(21) Appl. No.: 13/764,551

(22) Filed: Feb. 11, 2013

(65) Prior Publication Data

US 2013/0152164 A1    Jun. 13, 2013

Related U.S. Application Data

(63) Continuation of application No. 12/784,201, filed on May 20, 2010, now Pat. No. 8,453,256.

(51) Int. Cl.
*G06F 7/04* (2006.01)
*H04L 29/06* (2006.01)
*H04L 9/32* (2006.01)

(52) U.S. Cl.
CPC .............. *H04L 63/20* (2013.01); *H04L 9/3297* (2013.01)
USPC ......... 726/28; 726/1; 726/19; 726/26; 726/27

(58) Field of Classification Search
CPC ............................. H04L 63/20; H04L 9/3297
USPC ....... 726/1, 19, 26, 27, 28; 707/783
See application file for complete search history.

(56) References Cited

U.S. PATENT DOCUMENTS

| 7,383,271 | B2 | 6/2008 | Yip et al. | |
|---|---|---|---|---|
| 7,440,973 | B2 | 10/2008 | Tsukerman et al. | |
| 7,464,105 | B2 | 12/2008 | Smith | |
| 2004/0205271 | A1* | 10/2004 | O'Hare et al. | 710/240 |
| 2006/0069753 | A1 | 3/2006 | Hu et al. | |
| 2008/0066049 | A1 | 3/2008 | Jain et al. | |
| 2008/0275880 | A1* | 11/2008 | Bird et al. | 707/9 |
| 2009/0055235 | A1 | 2/2009 | Oral et al. | |
| 2009/0133026 | A1 | 5/2009 | Aggarwal et al. | |

OTHER PUBLICATIONS

"Oracle Enterprise Manager 10g: Oracle Configuration Management Pack for Applications" Oracle Data Sheet, Oracle International Corporation, Oct. 2008, 7 pages.

* cited by examiner

*Primary Examiner* — Baotran N To
(74) *Attorney, Agent, or Firm* — VanLeeuwen & VanLeeuwen; William J. Stock

(57) ABSTRACT

An approach receives a request from a user, typically a change implementer, on a computer system. The request includes a user identifier and a requested action. A current timestamp corresponding to a computer system clock is retrieved. Scheduled changes are retrieved from a data store accessible by the processor. The current timestamp is compared to the scheduled change periods. The requested action is allowed if the comparison reveals that the current timestamp is within one of the retrieved scheduled changes, and the requested action is denied if the comparison reveals that the current timestamp is outside of the retrieved scheduled change periods.

9 Claims, 6 Drawing Sheets

TAKING CONFIGURATION MANAGEMENT DATA AND CHANGE BUSINESS PROCESS DATA INTO ACCOUNT WITH REGARD TO AUTHORIZATION AND AUTHENTICATION RULES

This application is a continuation application of U.S. Patent Application No. 12/784,201, filed on May 20, 2010, and issued as U.S. Patent No. 8,453,256 on May 28. 2013.

BACKGROUND

Traditional change management solutions may provide notifications to users regarding upcoming changes scheduled for a particular computer system. However, these traditional systems do not restrict access to systems based on scheduled changes nor do these traditional systems prevent unapproved (scheduled or unscheduled) changes on a system.

SUMMARY

An approach receives a request from a user, typically a change implementer, on a computer system. The request includes a user identifier and a requested action. A current timestamp corresponding to a computer system clock is retrieved. Scheduled changes are retrieved from a data store accessible by the processor. The current timestamp is compared to the scheduled change periods. The requested action is allowed if the comparison reveals that the current timestamp is within one of the retrieved scheduled changes, and the requested action is denied if the comparison reveals that the current timestamp is outside of the retrieved scheduled change periods.

The foregoing is a summary and thus contains, by necessity, simplifications, generalizations, and omissions of detail; consequently, those skilled in the art will appreciate that the summary is illustrative only and is not intended to be in any way limiting. Other aspects, inventive features, and advantages of the present invention, as defined solely by the claims, will become apparent in the non-limiting detailed description set forth below.

BRIEF DESCRIPTION OF THE DRAWINGS

The present invention may be better understood, and its numerous objects, features, and advantages made apparent to those skilled in the art by referencing the accompanying drawings, wherein.

DETAILED DESCRIPTION

Certain specific details are set forth in the following description and figures to provide a thorough understanding of various embodiments of the invention. Certain well-known details often associated with computing and software technology are not set forth in the following disclosure, however, to avoid unnecessarily obscuring the various embodiments of the invention. Further, those of ordinary skill in the relevant art will understand that they can practice other embodiments of the invention without one or more of the details described below. Finally, while various methods are described with reference to steps and sequences in the following disclosure, the description as such is for providing a clear implementation of embodiments of the invention, and the steps and sequences of steps should not be taken as required to practice this invention. Instead, the following is intended to provide a detailed description of an example of the invention and should not be taken to be limiting of the invention itself. Rather, any number of variations may fall within the scope of the invention, which is defined by the claims that follow the description.

The following detailed description will generally follow the summary of the invention, as set forth above, further explaining and expanding the definitions of the various aspects and embodiments of the invention as necessary. To this end, this detailed description first sets forth a computing environment in FIG. 1 that is suitable to implement the software and/or hardware techniques associated with the invention.

Figure 1:
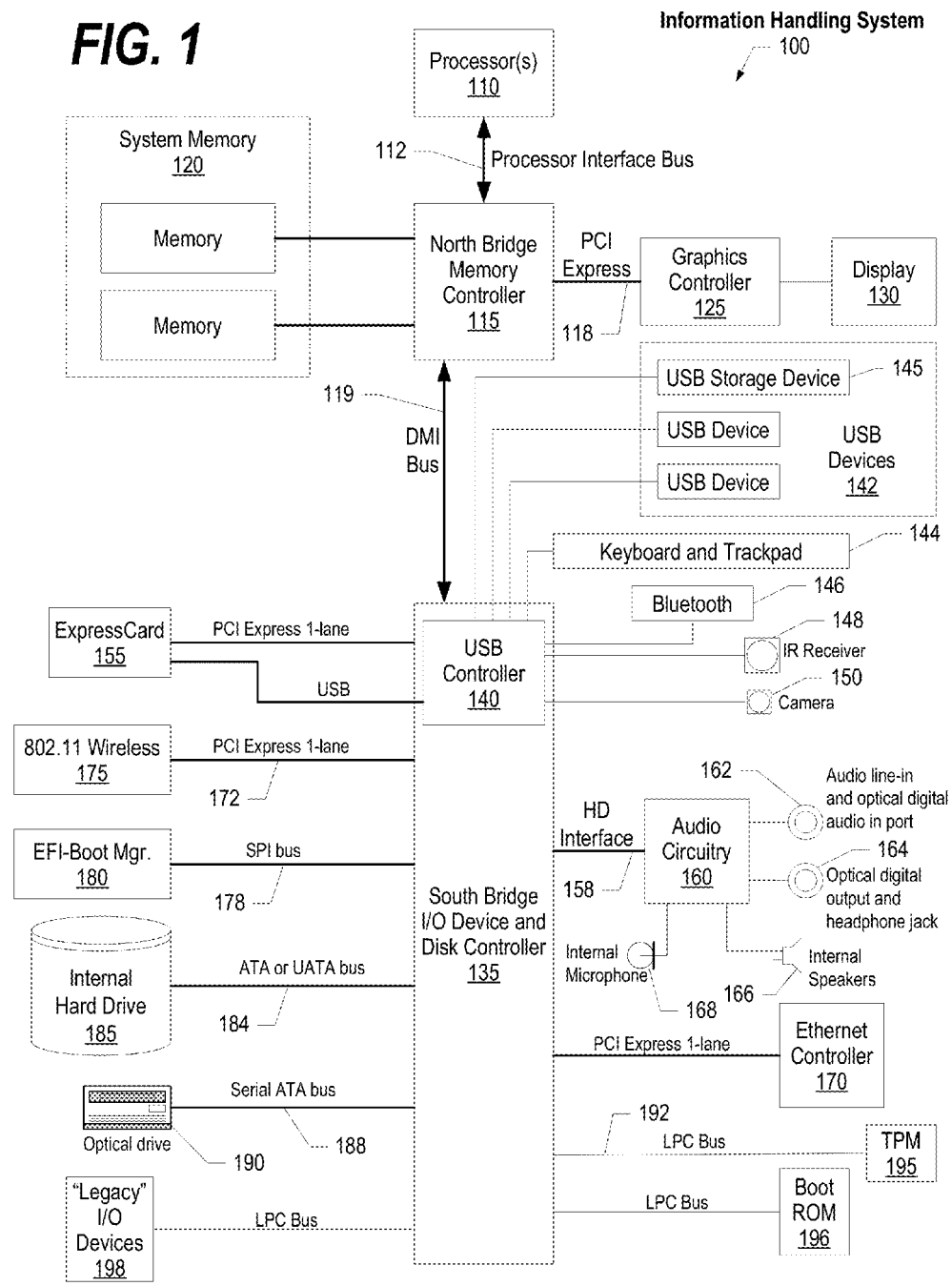
FIG. 1 is a block diagram of a data processing system in which the methods described herein can be implemented.

FIG. 1 illustrates information handling system 100, which is a simplified example of a computer system capable of performing the computing operations described herein. Information handling system 100 includes one or more processors 110 coupled to processor interface bus 112. Processor interface bus 112 connects processors 110 to Northbridge 115, which is also known as the Memory Controller Hub (MCH). Northbridge 115 connects to system memory 120 and provides a means for processor(s) 110 to access the system memory. Graphics controller 125 also connects to Northbridge 115. In one embodiment, PCI Express bus 118 connects Northbridge 115 to graphics controller 125. Graphics controller 125 connects to display device 130, such as a computer monitor.

Northbridge 115 and Southbridge 135 connect to each other using bus 119. In one embodiment, the bus is a Direct Media Interface (DMI) bus that transfers data at high speeds in each direction between Northbridge 115 and Southbridge 135. In another embodiment, a Peripheral Component Interconnect (PCI) bus connects the Northbridge and the Southbridge. Southbridge 135, also known as the I/O Controller Hub (ICH) is a chip that generally implements capabilities that operate at slower speeds than the capabilities provided by the Northbridge. Southbridge 135 typically provides various busses used to connect various components. These busses include, for example, PCI and PCI Express busses, an ISA bus, a System Management Bus (SMBus or SMB), and/or a Low Pin Count (LPC) bus. The LPC bus often connects low-bandwidth devices, such as boot ROM 196 and "legacy" I/O devices (using a "super I/O" chip). The "legacy" I/O devices (198) can include, for example, serial and parallel ports, keyboard, mouse, and/or a floppy disk controller. The LPC bus also connects Southbridge 135 to Trusted Platform Module (TPM) 195. Other components often included in Southbridge 135 include a Direct Memory Access (DMA) controller, a Programmable Interrupt Controller (PIC), and a storage device controller, which connects Southbridge 135 to nonvolatile storage device 185, such as a hard disk drive, using bus 184.

ExpressCard 155 is a slot that connects hot-pluggable devices to the information handling system. ExpressCard 155 supports both PCI Express and USB connectivity as it connects to Southbridge 135 using both the Universal Serial Bus (USB) the PCI Express bus. Southbridge 135 includes USB Controller 140 that provides USB connectivity to devices that connect to the USB. These devices include webcam (camera) 150, infrared (IR) receiver 148, keyboard and trackpad 144, and Bluetooth device 146, which provides for wireless personal area networks (PANs). USB Controller 140 also provides USB connectivity to other miscellaneous USB connected devices 142, such as a mouse, removable nonvolatile storage device 145, modems, network cards, ISDN connectors, fax, printers, USB hubs, and many other types of USB connected devices. While removable nonvolatile storage device 145 is shown as a USB-connected device, removable nonvolatile storage device 145 could be connected using a different interface, such as a Firewire interface, etcetera.

Wireless Local Area Network (LAN) device 175 connects to Southbridge 135 via the PCI or PCI Express bus 172. LAN device 175 typically implements one of the IEEE 802.11 standards of over-the-air modulation techniques that all use the same protocol to wireless communicate between information handling system 100 and another computer system or device. Optical storage device 190 connects to Southbridge 135 using Serial ATA (SATA) bus 188. Serial ATA adapters and devices communicate over a high-speed serial link. The Serial ATA bus also connects Southbridge 135 to other forms of storage devices, such as hard disk drives. Audio circuitry 160, such as a sound card, connects to Southbridge 135 via bus 158. Audio circuitry 160 also provides functionality such as audio line-in and optical digital audio in port 162, optical digital output and headphone jack 164, internal speakers 166, and internal microphone 168. Ethernet controller 170 connects to Southbridge 135 using a bus, such as the PCI or PCI Express bus. Ethernet controller 170 connects information handling system 100 to a computer network, such as a Local Area Network (LAN), the Internet, and other public and private computer networks.

While FIG. 1 shows one information handling system, an information handling system may take many forms. For example, an information handling system may take the form of a desktop, server, portable, laptop, notebook, or other form factor computer or data processing system. In addition, an information handling system may take other form factors such as a personal digital assistant (PDA), a gaming device, ATM machine, a portable telephone device, a communication device or other devices that include a processor and memory.

Figure 2:
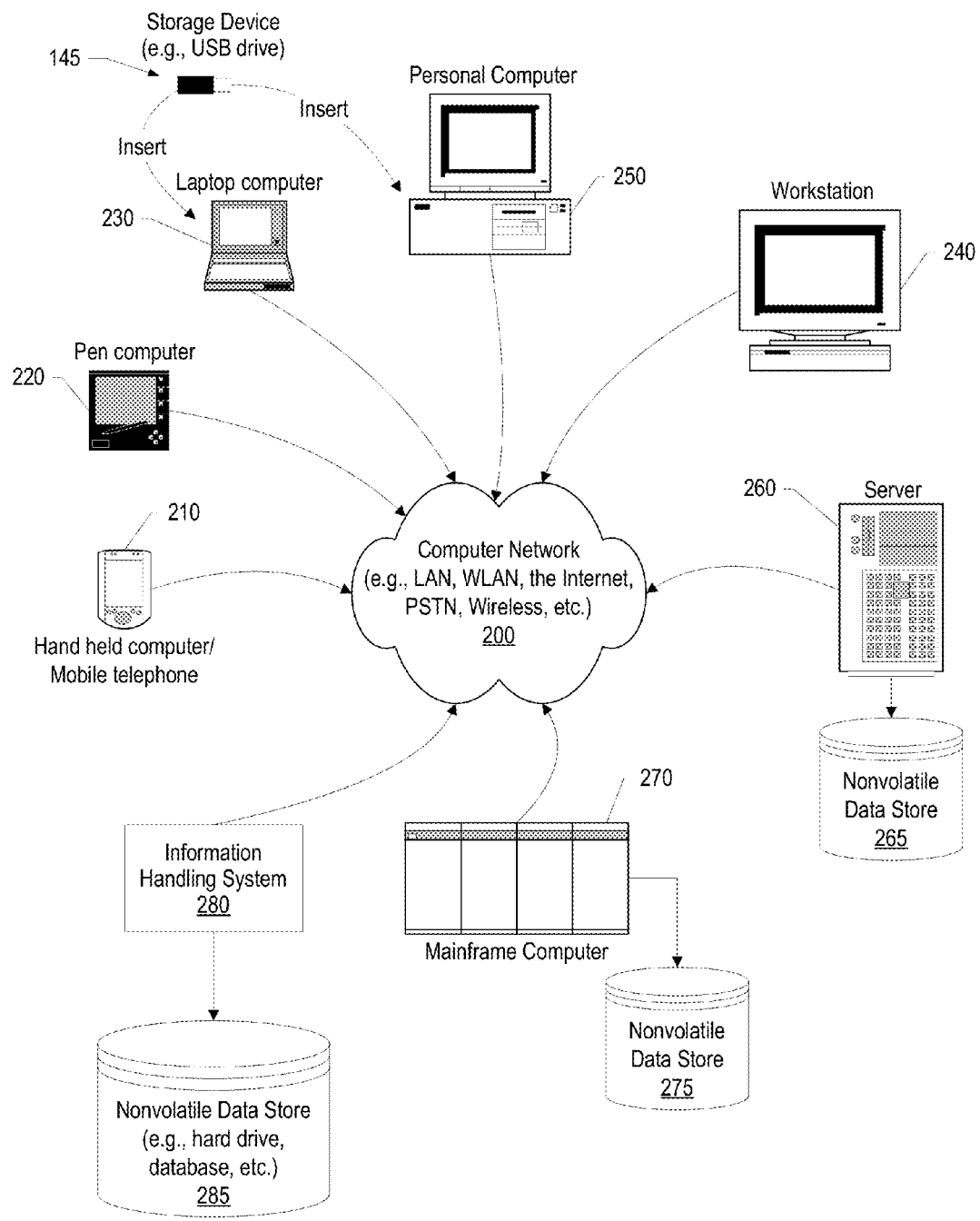
FIG. 2 is a network diagram of various types of data processing systems connected via a computer network.

FIG. 2 is a network diagram of various types of data processing systems connected via a computer network. FIG. 2 provides an extension of the information handling system environment shown in FIG. 1 to illustrate that the methods described herein can be performed on a wide variety of information handling systems that operate in a networked environment. Types of information handling systems range from small handheld devices, such as handheld computer/mobile telephone 210 to large mainframe systems, such as mainframe computer 270. Examples of handheld computer 210 include personal digital assistants (PDAs), personal entertainment devices, such as MP3 players, portable televisions, and compact disc players. Other examples of information handling systems include pen, or tablet, computer 220, laptop, or notebook, computer 230, workstation 240, personal computer system 250, and server 260. Other types of information handling systems that are not individually shown in FIG. 2 are represented by information handling system 280. As shown, the various information handling systems can be networked together using computer network 200. Types of computer network that can be used to interconnect the various information handling systems include Local Area Networks (LANs), Wireless Local Area Networks (WLANs), the Internet, the Public Switched Telephone Network (PSTN), other wireless networks, and any other network topology that can be used to interconnect the information handling systems. Many of the information handling systems include nonvolatile data stores, such as hard drives and/or nonvolatile memory. Some of the information handling systems shown in FIG. 2 depicts separate nonvolatile data stores (server 260 utilizes nonvolatile data store 265, mainframe computer 270 utilizes nonvolatile data store 275, and information handling system 280 utilizes nonvolatile data store 285). The nonvolatile data store can be a component that is external to the various information handling systems or can be internal to one of the information handling systems. In addition, removable nonvolatile storage device 145 can be shared among two or more information handling systems using various techniques, such as connecting the removable nonvolatile storage device 145 to a USB port or other connector of the information handling systems.

Figure 3:
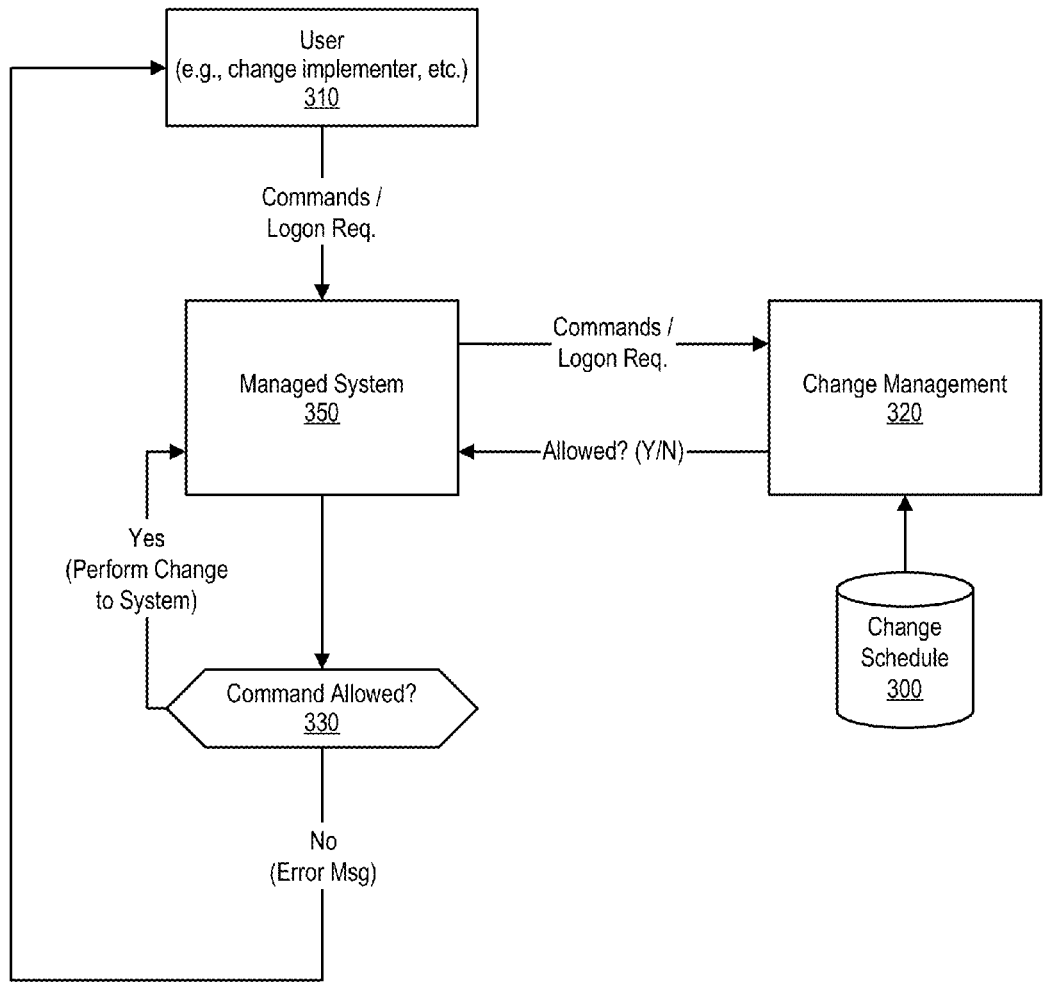
FIG. 3 is a high level flowchart depicting a change management system determining whether changes requested by an administrator are allowed per a change schedule.

FIG. 3 is a high level flowchart depicting a change management system determining whether changes requested by an administrator are allowed per change schedule 300. User 310, such as a system administrator or other change implementor that performs maintenance on a computer system, requests that commands be performed. These commands can include login commands to log the user onto managed system 350, or other commands to be performed on managed system 350 after the user has been successfully logged onto the managed system. Change management system 320 checks the incoming commands using data included in change schedule 300. The change schedule includes scheduled change windows for the managed system as well as user identifiers and commands scheduled to be performed during the change window. A determination is made as to whether the command requested by the user is allowed at the current time based upon the change schedule (decision 330). If the command is not allowed (e.g., a login attempt, a particular command, etc.), then decision 330 branches to the "no" branch whereupon an error message is displayed to the user informing the user that the command is not allowed because it is being attempted outside of a scheduled change window. On the other hand, if the change is allowed at the current time (e.g., command entered during a valid change window, command not prevented by the changes/commands identified by the change window, etc.), then decision 330 branches to the "yes" branch whereupon the requested command is performed on managed system 350.

One reason, of many, that the system might be helpful is limiting when a change implementer, such as a system administrator, is allowed to update an existing system and helping prevent the change implementer from making changes that may adversely impact other users. For example, users may be informed that a particular system is scheduled for an update between the hours of 1:00 AM and 3:00 AM and may be trying to finish some work on the system before the scheduled change period arrives. If a change implementer updates the system before this period, the user may still be using the system and can be adversely impacted. This reason is exacerbated when, in some environments, several change implementers are allowed to use privileged accounts that are able to perform system updates. Using the system described herein, these privileged accounts can be limited to performing the update during the scheduled change period. In this manner, none of the change implementers is able to use the privileged account to update the system outside of the scheduled change period.

Figure 4:
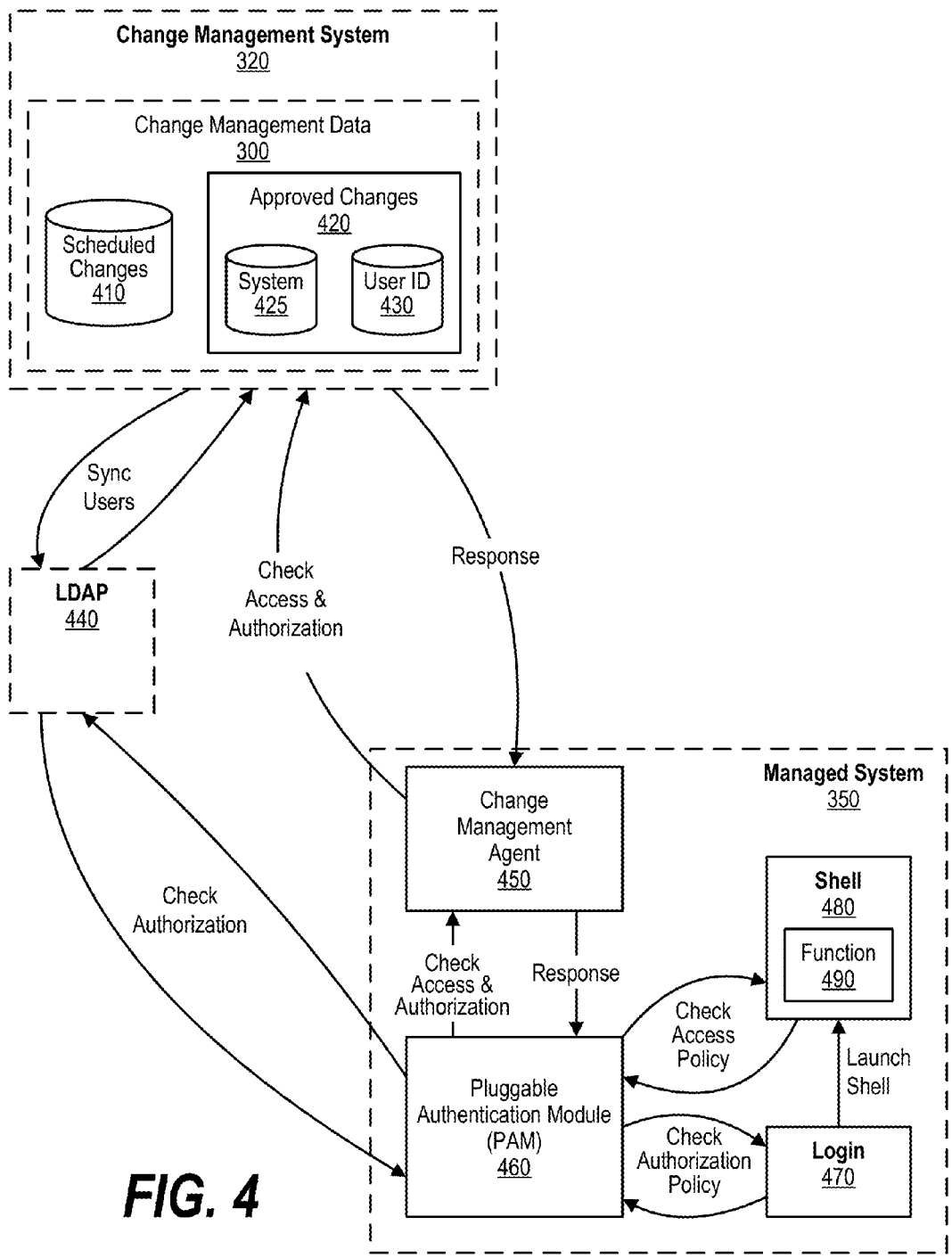
FIG. 4 is an exemplary diagram of a change management system interacting with a managed system to determine whether requested changes should be allowed.

FIG. 4 is an exemplary diagram of a change management system interacting with a managed system to determine whether requested changes should be allowed. This diagram depicts various components involved with the system as well as some of the data flows between these components. Two component systems, change management system 320 and managed system 350 are shown with user management facilitated by Lightweight Directory Access Protocol (LDAP) server 440. As shown, change management system 320 is capable of managing several managed systems including managed system 350. Change management system 320 maintains change management data 300 on an accessible data store, such as a hard drive or memory. Change management data 300 includes details regarding one or more scheduled change periods 410 including system identifiers of the managed system(s) scheduled for changes as well as dates and times indicating when the change is scheduled to take place. Change management data 300 further includes approved changes data store 420 that further includes system data 425 and user identifier data 430. In one embodiment, user identifier data 430 includes the user identifier(s) of the system accounts that are approved to make the change. In one embodiment, system data 425 includes the system identifier corresponding to the managed system that is scheduled for a change. In a further embodiment, approved changes 420 include a restriction policy that indicates whether a system-wide restriction is in place for the corresponding managed system, whether a command-based restriction is in place for the corresponding managed system, or whether both system-wide and command-based restrictions are in place for the corresponding managed system. When a system-wide restriction is in place, then the user identifier that is authorized to perform the changes is allowed to log onto the managed system during scheduled change windows. When a command-based restriction is in place, then commands entered by the user are checked and commands pertaining to the scheduled change (e.g., install commands, update commands, etc.) are blocked unless they are being requested during a scheduled change period. Moreover, scheduled change periods pertaining to system-wide change windows can be different from scheduled change periods pertaining to command-based change windows. For example, if a scheduled change period can be set up to allow a user identifier called "admin" to log onto a managed system between 1:00 AM and 6:00 AM but commands pertaining to the scheduled changes may by restricted to a scheduled change period between 2:00 AM and 6:00 AM. Therefore, in this example, an administrator can log onto the managed system after 1:00 AM using the "admin" user identifier, but would not be able to enter change commands (e.g., "install . . . ", "update . . . ", etc.) until 2:00 AM.

Managed system 350 includes various components. Login component 470 is a software function that checks the authorization policy being used by the managed system using pluggable authentication module (PAM) 460. PAM 460, in turn, retrieves the managed system's current authorization policy via LDAP 440 which retrieves the current authorization policy from change management system 320. In one embodiment, the authorization policy includes checking credentials (e.g., user identifier, password, etc.) provided by the user. Login component 470 launches shell 480 which includes function 490 to check the access policy (with access policies being restrictions such as "system-wide restriction," "command-based restriction," "both", etc.). In one embodiment, shell 480 communicates with PAM 460 for the access policy. PAM 460, in turn, communicates with change management agent 450 which is running on managed system 350. In one embodiment, change management agent communicates with change management system 320 in order to receive the access policies used in managed system 350. If a system-wide restriction is in place, the user identifier is compared to a list of restricted user identifiers and a list of scheduled change periods to determine whether the user identifier is allowed to log onto the managed system at the current time. If the user identifier is not allowed to log onto the managed system at the current time, then the user is provided an error message and the user identifier is not allowed to log onto managed system 350. If a command-based restriction is in place, then, in one embodiment, change management agent 450 forwards commands entered by the user to change management system 320 and receives a response indicating whether the entered command is permitted at the current time. If the command entered by the user is allowed, then the command is performed (executed) on managed system 350. However, if the command entered by the user is not allowed at the current time, then the command is blocked from executing and the user is provided with an error message indicating that the command has been entered outside the time bounds set by a scheduled change period.

Figure 5:
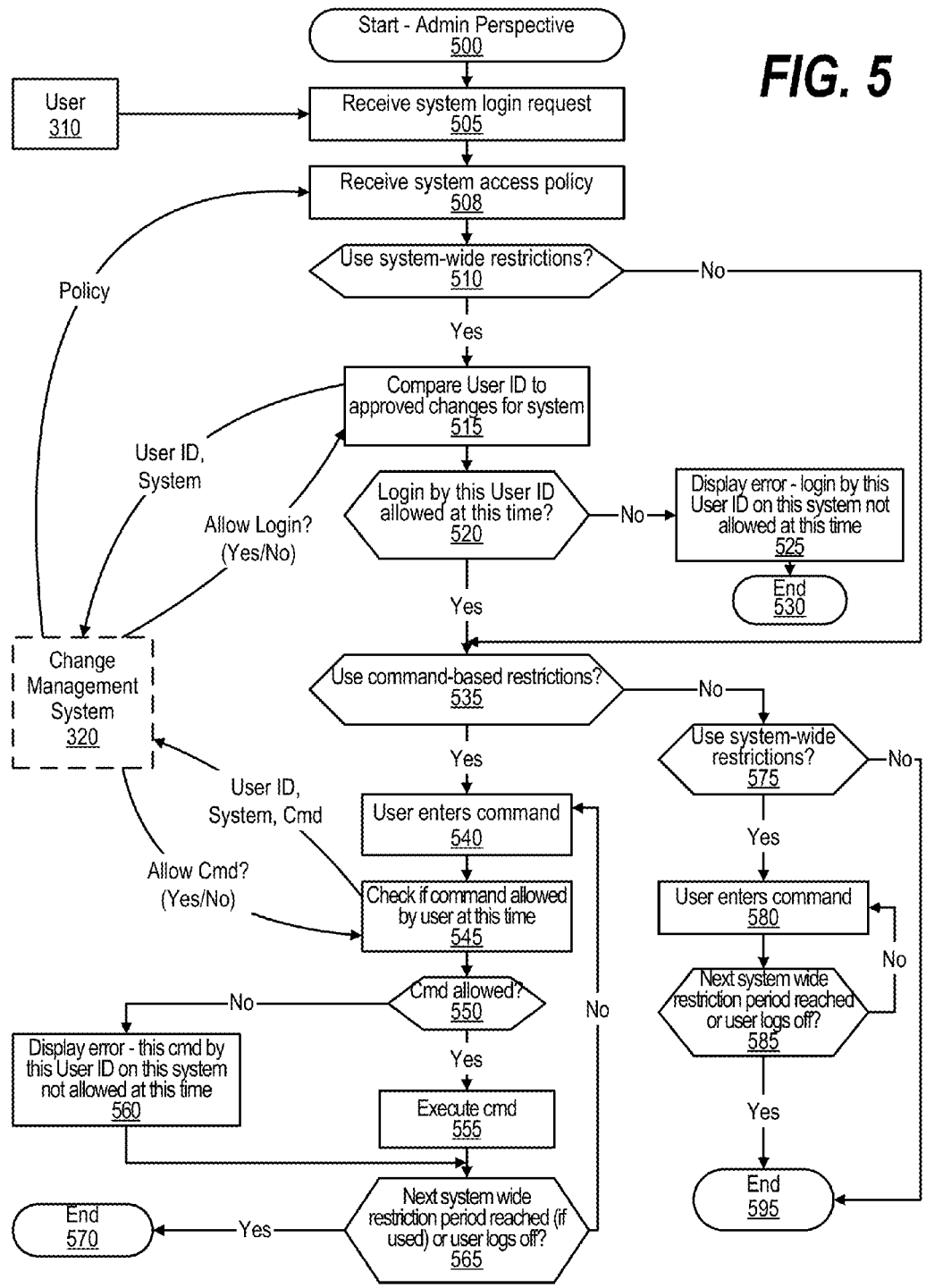
FIG. 5 is an exemplary flowchart diagram from a system administrator's perspective of the change management system determining whether the administrator's requests should be performed.

FIG. 5 is an exemplary flowchart diagram from a system administrator's perspective of the change management system determining whether the administrator's requests should be performed. Processing commences at 500 whereupon, at step 505, a system login request to a managed system is received from user 310, such as an administrator. At step 580, the access policy corresponding to the managed system is received from change management system 320.

A determination is made as to whether the access policy corresponding to this managed system is to use system-wide restrictions (decision 510). A system-wide restriction is used to prevent certain user identifiers (e.g., administrator accounts, etc.) from accessing the managed system outside of scheduled change periods. If system-wide restrictions are part of the system access policy, then decision 510 branches to the "yes" branch whereupon, at step 515, the user identifier provided by user 310 is compared to user identifiers maintained by change management system 320. Either a "blacklist" or "whitelist" approach can be utilized. In a blacklist approach, those user identifiers that are prohibited from accessing the managed system outside the scheduled change period are maintained in a list on change management system 320 and compared with the user identifier provided by user 310, while in a whitelist approach, those user identifiers that are allowed to access the managed system outside of the scheduled change period are maintained in a list on change management system 320. In one embodiment, the list (e.g, blacklist, whitelist, etc.) is sent from change management system 320 to the managed system and the comparison (step 515) is made on the managed system, while in another embodiment, the parameters (user identifier, system identifier of the managed system, etc.) are sent to change management system 320 and the change management system provides a response. A determination is made as to whether the requested login by this user identifier is allowed at this time (decision 520). If the login is not allowed, then decision 520 branches to the "no" branch whereupon, at step 525, an error is displayed to the user indicating that this user identifier cannot logon to the managed system at this time due to a scheduled change period and processing terminates at 530. On the other hand, if login by this user identifier is allowed at this time, then decision 520 branches to the "yes" branch to continue processing.

If either system-wide restrictions are not being used (decision 510 branching to the "no" branch) or login by this user identifier is allowed at this time (decision 520 branching to the "yes" branch), then a determination is made as to whether the system access policy for this managed system includes using command-based restrictions (decision 535). If a command-based restriction policy is in place for this managed system, then decision 535 branches to the "yes" branch whereupon, at step 540, the user enters a command and, at step 545, the system checks as to whether the entered command is allowed to be executed by this user identifier at this time. As previously discussed, the checking performed at step 545 can be performed either at the managed system or at change management system 320. A determination is made as to whether the command entered by the user is allowed at the current time (decision 550). If the command is allowed, then decision 550 branches to the "yes" branch whereupon, at step 555, the command is executed. On the other hand, if the command is not permitted to be executed by this user identifier at this time on this managed system, then decision 550 branches to the "no" branch whereupon, at step 560, an error message is displayed indicating that this user identifier is not permitted to execute the command at this time as it is outside of a previously established scheduled change period and the command is not executed. A determination is made as to whether a system-wide restriction period is entered, if a system-wide restriction policy is in place for this managed system (e.g., the user logged onto the system at 11:00 PM one hour ago, and the system-wide restriction that applies to this managed system takes effect at midnight, then the system-wide restriction period would be reached when the user is still logged on at midnight, etc.), or if the user logs off of the system (decision 565). If the next system-wide restriction period is reached and is being used by this managed system or if the user logs off of this managed system, then decision 565 branches to the "yes" branch and processing ends at 570. On the other hand, if neither of these conditions is true, then decision 565 branches to the "no" branch which loops back to receive the next command entered by the user and process it as described above. This looping continues until either the next system-wide restriction period is reached or until the user logs off of the managed system.

Returning to decision 535, if command-based restrictions are not being used, then decision 535 branches to the "no" branch whereupon a determination is made as to whether system-wide restrictions are being used for this managed system (decision 575). If system-wide restrictions are not being used for this managed system, then decision 575 branches to the "no" branch and processing ends at 595. On the other hand, system-wide restrictions are being used, then decision 575 branches to the "yes" branch whereupon, at step 580, the user enters a command at the managed system. A determination is made as to whether a system-wide restriction period is entered, if a system-wide restriction policy is in place for this managed system (e.g., the user logged onto the system at 11:00PM one hour ago, and the system-wide restriction that applies to this managed system takes effect at midnight, then the system-wide restriction period would be reached when the user is still logged on at midnight, etc.), or if the user logs off of the system (decision 585). If the next system-wide restriction period is reached and is being used by this managed system or if the user logs off of this managed system, then decision 585 branches to the "yes" branch and processing ends at 595. On the other hand, if neither of these conditions is true, then decision 585 branches to the "no" branch which loops back to receive the next command entered by the user and processing continues until either the next system-wide restriction period is reached or until the user logs off of the managed system.

Figure 6:
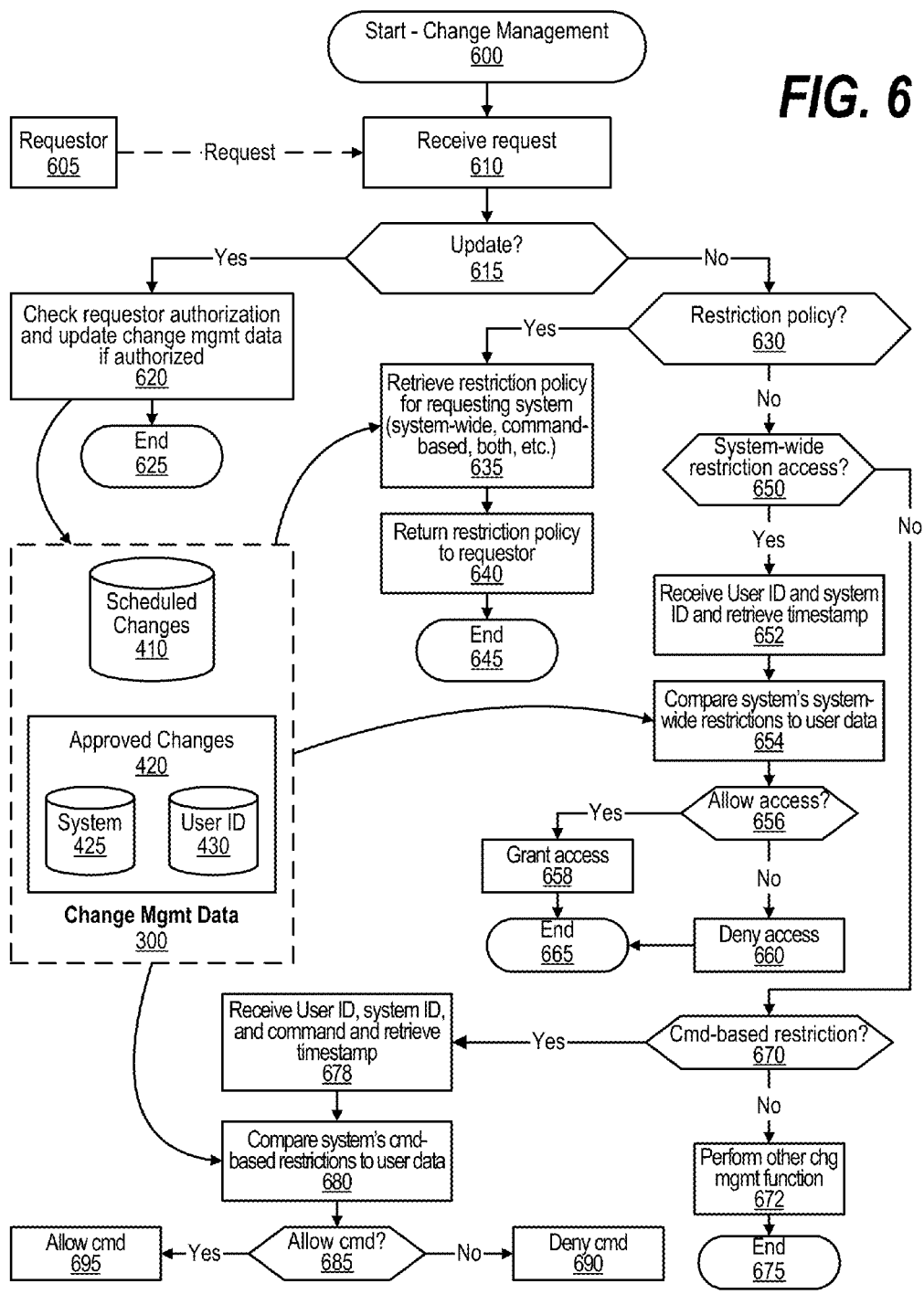
FIG. 6 is an exemplary flowchart diagram of processing performed by the change management system.

FIG. 6 is an exemplary flowchart diagram of processing performed by the change management system. Processing commences at 600 whereupon, at step 610, a request is received from requestor 605 (e.g., a request pertaining to one of potentially many managed systems being managed by the change management system). A determination is made as to whether the request is to update the change management system data (decision 615). If the request is to update change management system data, then decision 615 branches to the "yes" branch whereupon, at step 620, the requestor's authorization to make the change management system data change is checked and, if the requestor is authorized, then the requested change is made to change management data 300 (e.g., add, modify, delete a scheduled change period; change an access policy corresponding to a managed system, change a user identifier and/or commands authorized for a particular scheduled change period, etc.) and processing thereafter ends at 625. On the other hand, if the request is not to update the change management data, then decision 615 branches to the "no" branch.

A determination is made as to whether the request is to retrieve a restriction policy in place for one of the managed systems (decision 630). If the request is to retrieve the restriction policy (e.g., "system-wide," "command-based," "both," etc.), then decision 630 branches to the "yes" branch whereupon, at step 635, the restriction policy for the managed system included in the request is retrieved from change management data 300 and, at step 640, the policy is returned to the requestor and processing thereafter ends at 645. On the other hand, if the request is not to retrieve the restriction policy, then decision 630 branches to the "no" branch.

A determination is made as to whether a system-wide restriction access policy is in place for the managed system (decision 650). If a system-wide restriction access policy is in place for the managed system, then decision 650 branches to the "yes" branch whereupon, at step 652, the user identifier and the system identifier are received along with the current timestamp. At step 654, the system identifier and the user identifier is used to search change management data to identify whether this user identifier is allowed to log onto the managed system at this time. A determination is made as to whether this user identifier is allowed to log onto the managed system at the current time (decision 656). If the user identifier is allowed to log onto the managed system at this time, then decision 656 branches to the "yes" branch whereupon, at step 658, a message is sent to the managed system indicating that the user is allowed to log onto the managed system and processing ends at 665. In one embodiment, the message includes the time of the next system-wide restriction so that the managed system can identify if the user identifier is still logged onto the managed system when the next scheduled change period is entered and take appropriate action (e.g., log the user identifier off of the system at that time, etc.). Returning to decision 656, if the user identifier is not allowed to log onto the managed system at the current time, then decision 656 branches to the "no" branch whereupon, at step 660, a message is sent to the managed system indicating that the managed system should deny the user access to the managed system using the user identifier at the current time, and processing thereafter ends at 665.

Returning to decision 650, if a system-wide restriction access policy action is not being requested, then decision 650 branches to the "no" branch whereupon a determination is made as to whether a command-based restriction access policy action is being requested (decision 670). If a command-based restriction access policy action is not being requested, then decision 670 branches to the "no" branch whereupon, at step 672, some other change management system function is performed and processing ends at 675.

On the other hand, if a command-based restriction access policy action is being requested, then decision 670 branches to the "yes" branch whereupon, at step 678, the user identifier of the user entering the command is received along with the managed system's system identifier and the command entered by the user as well as the current timestamp. At step 680, the managed system's command-based restrictions are compared to the user data (user identifier, command, and current timestamp). A determination is made as to whether the requested command is allowed on the managed system at this time by this particular user identifier (decision 685). If the command is allowed, then decision 685 branches to the "yes" branch whereupon, at step 695, a message is returned to the requestor indicating that the command is allowed to be executed. On the other hand, if the command is not allowed, then decision 685 branches to the "no" branch whereupon, at step 690, a message is returned to the requestor indicating that the command is not allowed by this user identifier at the current time.

One of the preferred implementations of the invention is a client application, namely, a set of instructions (program code) or other functional descriptive material in a code module that may, for example, be resident in the random access memory of the computer. Until required by the computer, the set of instructions may be stored in another computer memory, for example, in a hard disk drive, or in a removable memory such as an optical disk (for eventual use in a CD ROM) or floppy disk (for eventual use in a floppy disk drive). Thus, the present invention may be implemented as a computer program product for use in a computer. In addition, although the various methods described are conveniently implemented in a general purpose computer selectively activated or reconfigured by software, one of ordinary skill in the art would also recognize that such methods may be carried out in hardware, in firmware, or in more specialized apparatus constructed to perform the required method steps. Functional descriptive material is information that imparts functionality to a machine. Functional descriptive material includes, but is not limited to, computer programs, instructions, rules, facts, definitions of computable functions, objects, and data structures.

While particular embodiments of the present invention have been shown and described, it will be obvious to those skilled in the art that, based upon the teachings herein, that changes and modifications may be made without departing from this invention and its broader aspects. Therefore, the appended claims are to encompass within their scope all such changes and modifications as are within the true spirit and scope of this invention. Furthermore, it is to be understood that the invention is solely defined by the appended claims. It will be understood by those with skill in the art that if a specific number of an introduced claim element is intended, such intent will be explicitly recited in the claim, and in the absence of such recitation no such limitation is present. For non-limiting example, as an aid to understanding, the following appended claims contain usage of the introductory phrases "at least one" and "one or more" to introduce claim elements. However, the use of such phrases should not be construed to imply that the introduction of a claim element by the indefinite articles "a" or "an" limits any particular claim containing such introduced claim element to inventions containing only one such element, even when the same claim includes the introductory phrases "one or more" or "at least one" and indefinite articles such as "a" or "an"; the same holds true for the use in the claims of definite articles.

What is claimed is:

1. A processor-implemented method comprising:

receiving a request, wherein the request includes a user identifier, a system identifier, and a requested command, wherein the requested command comprises a command to be executed on a system corresponding to the system identifier;

retrieving one or more scheduled change periods from a data store accessible by the processor, wherein the retrieved scheduled change periods correspond to the system identifier included in the request;

determining if the requested command is included in a predetermined list of allowed commands associated with the user identifier included in the request;

in response to determining that a current time is within at least one of the retrieved scheduled change periods and that the requested command is included in the predetermined list of allowed commands associated with the user identifier included in the request, executing the requested command;

in response to executing the requested command, determining that a system-wide restriction period is reached, wherein the current time is not within any of the retrieved scheduled time periods; and in response to determining that the system-wide restriction period is reached, disallowing one or more subsequent requested commands, and informing a user associated with the user identifier that the one or more subsequent commands are disallowed.

2. The method of claim 1 further comprising:

receiving, from a requestor, a restriction policy request corresponding to the system;

retrieving a restriction policy corresponding to the system; and returning the retrieved restriction policy to the requestor.

3. The method of claim 2 wherein the restriction policy is selected from a group consisting of the system-wide restriction policy, a command-based restriction policy, and a combination of the system-wide and command-based restriction policies.

4. An information handling system comprising:

one or more processors;

a memory coupled to at least one of the processors;

a set of instructions stored in the memory and executed by at least one of the processors in order to perform actions of:

receiving a request, wherein the request includes a user identifier, a system identifier, and a requested command, wherein the requested command comprises a command to be executed on a system corresponding to the system identifier;

retrieving one or more scheduled change periods from a data store, wherein the retrieved scheduled change periods correspond to the system identifier included in the request;

determining if the requested command is included in a predetermined list of allowed commands associated with the user identifier included in the request;

in response to determining that a current time is within at least one of the retrieved scheduled change periods and that the requested command is included in the predetermined list of allowed commands associated with the user identifier included in the request, executing the requested command;

in response to executing the requested command, determining that a system-wide restriction period is reached, wherein the current time is not within any of the retrieved scheduled time periods; and in response to determining that the system-wide restriction period is reached, disallowing one or more subsequent requested commands, and informing a user associated with the user identifier that the one or more subsequent commands are disallowed.

5. The information handling system of claim 4 wherein the processors perform further actions comprising:

receiving, from a requestor, a restriction policy request corresponding to a system selected from a plurality of systems;

retrieving a restriction policy corresponding to the selected system; and returning the retrieved restriction policy to the requestor.

6. The information handling system of claim 5 wherein the restriction policy is selected from a group consisting of the system-wide restriction policy, a command-based restriction policy, and a combination of the system-wide and command-based restriction policies.

7. A computer program product stored in a computer readable memory device, comprising functional descriptive material that, when executed by an information handling system, causes the information handling system to perform actions that include:

receiving a request, wherein the request includes a user identifier, a system identifier, and a requested command, wherein the requested command comprises a command to be executed on a system corresponding to the system identifier;

retrieving one or more scheduled change periods from a data store accessible by the processor, wherein the retrieved scheduled change periods correspond to the system identifier included in the request;

determining if the requested command is included in a predetermined list of allowed commands associated with the user identifier included in the request;

in response to determining that a current time is within at least one of the retrieved scheduled change periods and that the requested command is included in the predetermined list of allowed commands associated with the user identifier included in the request, executing the requested command;

in response to executing the requested command, determining that a system-wide restriction period is reached, wherein the current time is not within any of the retrieved scheduled time periods; and in response to determining that the system-wide restriction period is reached, disallowing one or more subsequent requested commands, and informing a user associated with the user identifier that the one or more subsequent commands are disallowed.

8. The computer program product of claim 7 wherein the actions further comprise:

receiving, from a requestor, a restriction policy request corresponding to a system selected from a plurality of systems;

retrieving a restriction policy corresponding to the selected system; and returning the retrieved restriction policy to the requestor.

9. The computer program product of claim 8 wherein the restriction policy is selected from a group consisting of the system-wide restriction policy, a command-based restriction policy, and a combination of the system-wide and command-based restriction policies.

* * * * *